US010012671B2

(12) United States Patent
Lin (10) Patent No.: US 10,012,671 B2
(45) Date of Patent: Jul. 3, 2018

(54) MICRO-ELECTRO-MECHANICAL SYSTEM DEVICE (71) Applicant: RICHTEK TECHNOLOGY CORPORATION, Zhubei, Hsinchu (TW)

(72) Inventor: Shih-Chieh Lin, Kaohsiung (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 49 days.

(21) Appl. No.: 14/931,696

(22) Filed: Nov. 3, 2015

(65) Prior Publication Data

US 2017/0122974 A1     May 4, 2017

(51) Int. Cl.
*G01P 15/125* (2006.01)

(52) U.S. Cl.
CPC .................. *G01P 15/125* (2013.01)

(58) Field of Classification Search
CPC ............. G01P 15/125; G01P 2015/0868
See application file for complete search history.

(56) References Cited

U.S. PATENT DOCUMENTS

| 5,983,721 A | 11/1999 | Sulzberger et al. |
| 7,322,242 B2 | 1/2008 | Merassi et al. |
| 2008/0314147 A1* | 12/2008 | Nasiri ............... G01P 15/125 73/514.32 |
| 2010/0122579 A1* | 5/2010 | Hsu .................. G01P 15/125 73/514.32 |
| 2012/0000287 A1 | 1/2012 | Frangi et al. |
| 2013/0214367 A1 | 8/2013 | van der Heide et al. |

OTHER PUBLICATIONS

Huikai Xie, Vertical comb-finger capacitive actuation and sensing for CMOS-MEMS, Sensors and Actuators a 95 (2002) 212-221.*

* cited by examiner

*Primary Examiner* — Peter Macchiarolo
*Assistant Examiner* — Irving A Campbell
(74) *Attorney, Agent, or Firm* — Tung & Associates (57) ABSTRACT

A MEMS device includes: a substrate; a proof mass suspended over the substrate, the proof mass including at least one proof mass body and a proof mass frame connected to and accommodating the proof mass body, the proof mass frame including at least one self-test frame; and at least one self-test electrode inside the self-test frame, and connected to the substrate; wherein when a voltage difference is applied between the self-test electrode and the self-test frame, the proof mass is driven to have an in-plane movement, and wherein the self-test electrode and the self-test frame do not form a sensing capacitor in between.

11 Claims, 6 Drawing Sheets

MICRO-ELECTRO-MECHANICAL SYSTEM DEVICE

BACKGROUND OF THE INVENTION

Field of Invention

The present invention relates to a micro-electro-mechanical system (MEMS) device, in particular a MEMS device wherein a self-test electrode is accommodated in a self-test frame to form a self-test unit outside a proof mass body.

Description of Related Art

In order to ensure correct operation of a MEMS device, a self-test unit disposed in the MEMS device is a common option. For reference, the followings are related prior art: U.S. Pat. Nos. 7,322,242, 5,983,721, and US Publication 2012/0000287 and US Publication 2013/0214367.

In prior art, there are two typical arrangements to dispose the self-test unit in the MEMS device. In the first arrangement, the self-test unit is a stand-alone unit which is disposed outside the sensing structure of the MEMS device. In the second arrangement, the self-test unit is disposed inside the proof mass body of the MEMS device. U.S. Pat. No. 7,322,242 is an example of the second arrangement.

The first arrangement will significantly increase the overall size of the MEMS device. The second arrangement, although requires less area than the first arrangement, still causes a negative impact on the performance of the MEMS device. That is, because a space needs to be provided inside the proof mass body, the mass quantity of the proof mass body is reduced, and the sensitivity of the MEMS device is reduced. Or, to maintain the same sensitivity, the area occupied by the proof mass body (its mass plus its inner space) needs to be increased.

Further, the prior art second arrangement is only capable of detecting an in-plane offset but can not detect an out-of-plane offset. The term "in-plane" refers to the plane where the proof mass body resides, and the term "out-of-plane" refers to a normal direction perpendicular to the plane where the proof mass body resides.

The present invention provides a solution to the above problem.

SUMMARY OF THE INVENTION

In one perspective, the present invention provides a MEMS device including: a substrate; a proof mass suspended over the substrate, the proof mass including at least one proof mass body and a proof mass frame connected to and accommodating the proof mass body, the proof mass frame including at least one self-test frame; and at least one self-test electrode inside the self-test frame and connected to the substrate; wherein when a voltage difference is applied between the self-test electrode and the self-test frame, the proof mass is driven to have an in-plane movement, and wherein the self-test electrode and the self-test frame do not form a sensing capacitor in between.

In one embodiment, the MEMS device further includes at least one fixed electrode connected to the substrate, and the proof mass further includes at least one moving electrode, wherein the at least one fixed electrode and the at least one moving electrode forms at least one sensing capacitor for sensing the in-plane movement of the proof mass.

In one embodiment, the MEMS device further includes at least one fixed electrode connected to the substrate or the proof mass frame, and the proof mass body further includes at least one moving electrode, wherein the at least one fixed electrode and the at least one moving electrode forms at least one sensing capacitor for sensing the in-plane movement of the proof mass.

In one embodiment, the MEMS device further includes two proof mass bodies accommodated inside the proof mass frame, and the two proof mass bodies are connected to each other by a linkage in between.

In one embodiment, the self-test electrode has a first side and a second side opposite to the first side. A first distance between the first side and a part of the self-test frame nearest to the first side is different from a second distance between the second side and another part of the self-test frame nearest to the second side.

In one embodiment, the MEMS device includes at least two self-test electrodes and at least two self-test frames forming at least two self-test units respectively, wherein a first one of the at least two self-test units (first self-test unit) is for driving the in-plane movement in a first in-plane direction, and a second one of the at least two self-test units (second self-test unit) is for driving the in-plane movement in a second in-plane direction, wherein the first in-plane direction is not parallel to the second in-plane direction.

In one embodiment, the self-test electrode of the first self-test unit has a rectangular shape having a longitudinal direction along the second in-plane direction, and the self-test electrode of the second self-test unit has a rectangular shape having a longitudinal direction along the first in-plane direction.

In one embodiment, the MEMS device includes at least one out-of-plane fixed electrode connected to the substrate, and the proof mass further comprising at least one out-of-plane moving electrode, wherein the at least one out-of-plane fixed electrode and the at least one out-of-plane moving electrode form at least one out-of-plane sensing capacitor for sensing an out-of-plane movement of the proof mass.

In one embodiment, the MEMS device further includes at least one out-of-plane self-test electrode located above or under the self-test frame in an out-of-plane direction, wherein when a voltage difference is applied between the out-of-plane self-test electrode and the self-test frame, the proof mass is driven to have an out-of-plane movement, and wherein the out-of-plane self-test electrode and the self-test frame do not form a sensing capacitor in between.

In one embodiment, the proof mass body has four sides, and at least one self-test unit is provided outside each side of the proof mass body. The self-test unit is formed by one of the self-test electrodes and the self-test frame corresponding to the one of the self-test electrodes.

In one embodiment, the proof mass frame includes a plurality of self-test frames and at least one self-test electrode is located inside each self-test frame.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, o show the interrelations between the components, but not drawn according to actual scale. The orientation wordings in the description such as: above, under, left, or right are for reference with respect to the drawings, but not for limiting the actual product made according to the present invention.

Figure 1A:
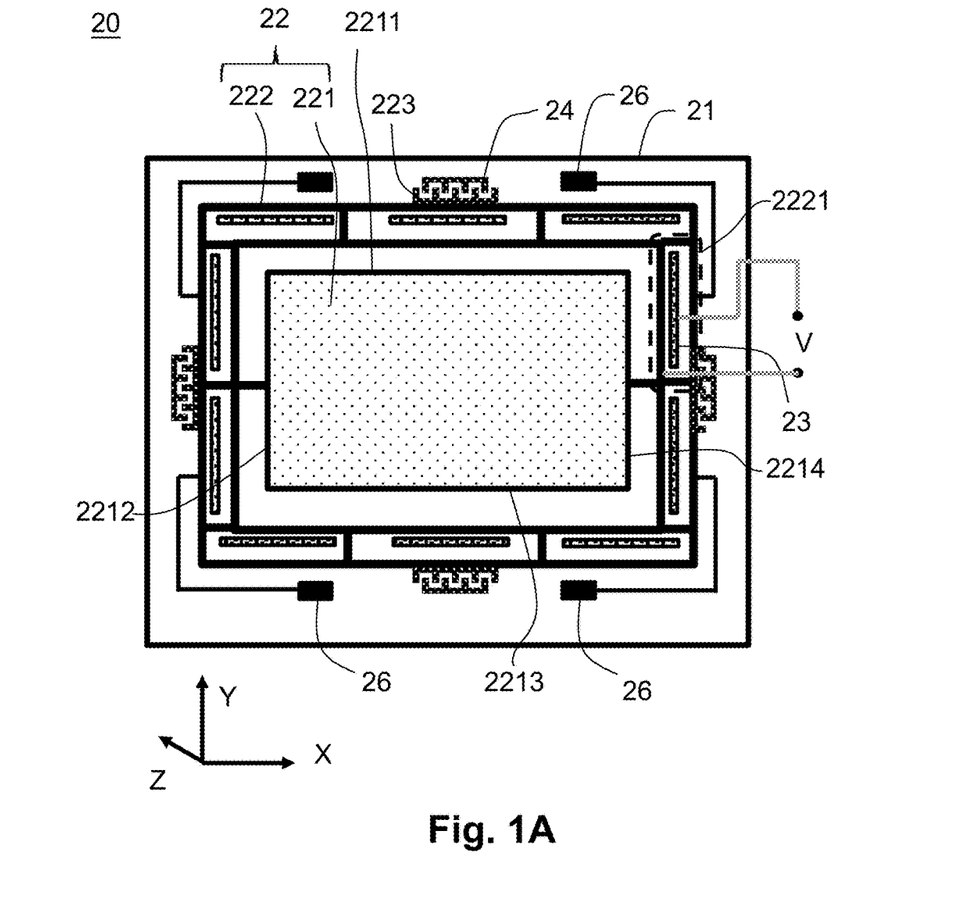
FIGS. 1A-1D show MEMS devices according to four embodiments of the present invention.

FIG. 1A shows a MEMS device 20 according to one embodiment of the present invention. The MEMS device 20 includes: a substrate 21; a proof mass 22 suspended over the substrate 21, the proof mass 22 including at least one proof mass body 221 and a proof mass frame 222 connected to and accommodating the proof mass body 221, the proof mass frame 222 including at least one self-test frame 2221; and at least one self-test electrode 23 inside the self-test frame 2221, and connected to the substrate 21; wherein when a voltage difference V is applied between the self-test electrode 23 and the self-test frame 2221, the proof mass 22 is driven to have an in-plane movement (in the X-Y plane), and wherein the self-test electrode 23 and the self-test frame 2221 do not form a sensing capacitor in between. The movement caused by the voltage difference V can be used to evaluate, e.g., whether the MEMS device 20 is properly designed; whether the structure of the MEMS device 20 is damaged; etc. FIG. 1A shows plural self-test electrodes 23 and plural self-test frames 2221. A self-test electrode 23 and a self-test frame 2221 form a self-test unit. However, please note that the number, location and arrangement of the self-test units shown in the figures are only for illustration purpose; the number, location and arrangement of the self-test units can be designed in many other ways within the spirit of the present invention.

When a voltage difference V is applied between the self-test electrode 23 and the self-test frame 2221, the electric field between the self-test electrode 23 and the self-test frame 2221 drives the proof mass 22 to move in the X-Y plane. The in-plane movement shows an offset of the proof mass 22 or the flexibility of the device structure. Hence, a self-test can be performed by applying a predetermined voltage difference V and checking the degree of the in-plane movement to see whether the device qualifies, and if desired, to compensate the offset by proper means (such as by a circuit processing the signals sensed by the device).

The present invention is different from the prior art MEMS device in that the self-test frames 2221 and the self-test electrodes 23 of the present invention are located inside the MEMS device but outside the proof mass body 221. Therefore, the self-test units formed by the self-test frames 2221 and the self-test electrodes 23 do not affect the area of the proof mass body 221. That is, in comparison with the prior art MEMS device wherein the self-test unit is disposed inside the proof mass body of the MEMS device (e.g., U.S. Pat. No. 7,322,242), to obtain the same sensitivity, the area of the proof mass body 221 of the present invention can be smaller than the area of the proof mass body of the prior art MEMS device ("area of the proof mass body" includes the mass and the inner space of the proof mass body). Furthermore, by providing an out-of-plane self-test electrode at a proper location above or under the self-test frame in an out-of-plane direction (i.e., Z direction), an out-of-plane self-test unit can be formed by the out-of-plane self-test electrode and the self-test frame, so that the present invention can do a three-dimensional self-test. The details of the out-of-plane self-test will be explained later with reference to FIG. 3.

Figure 1B:
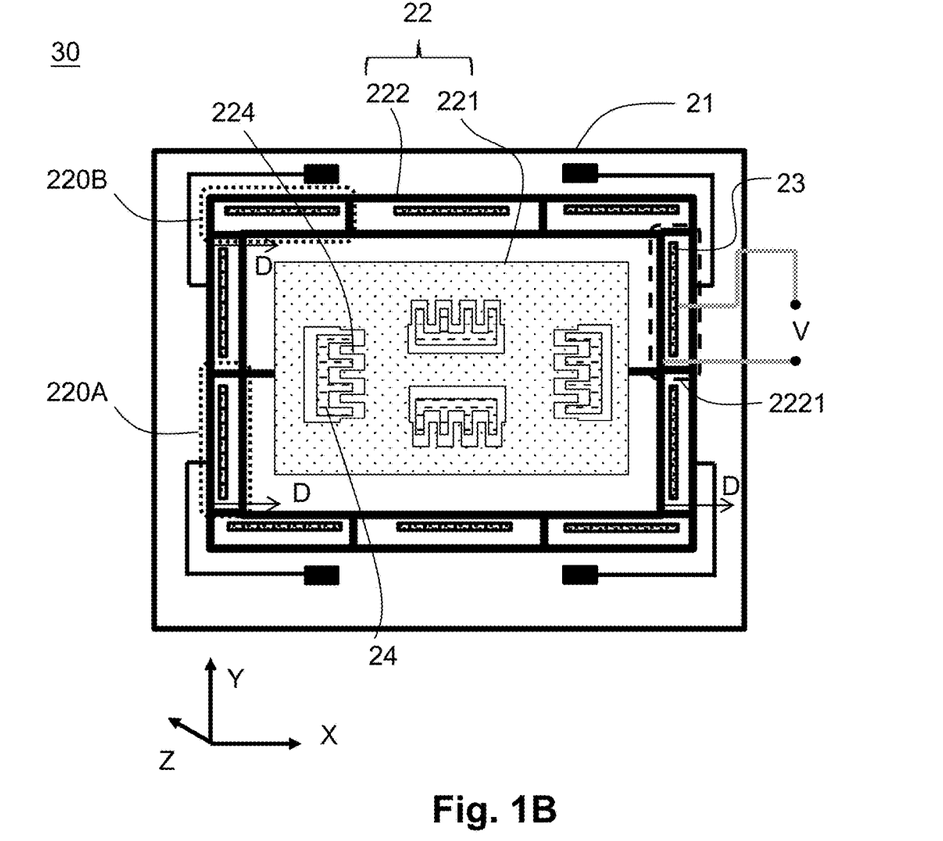
Figure 1C:
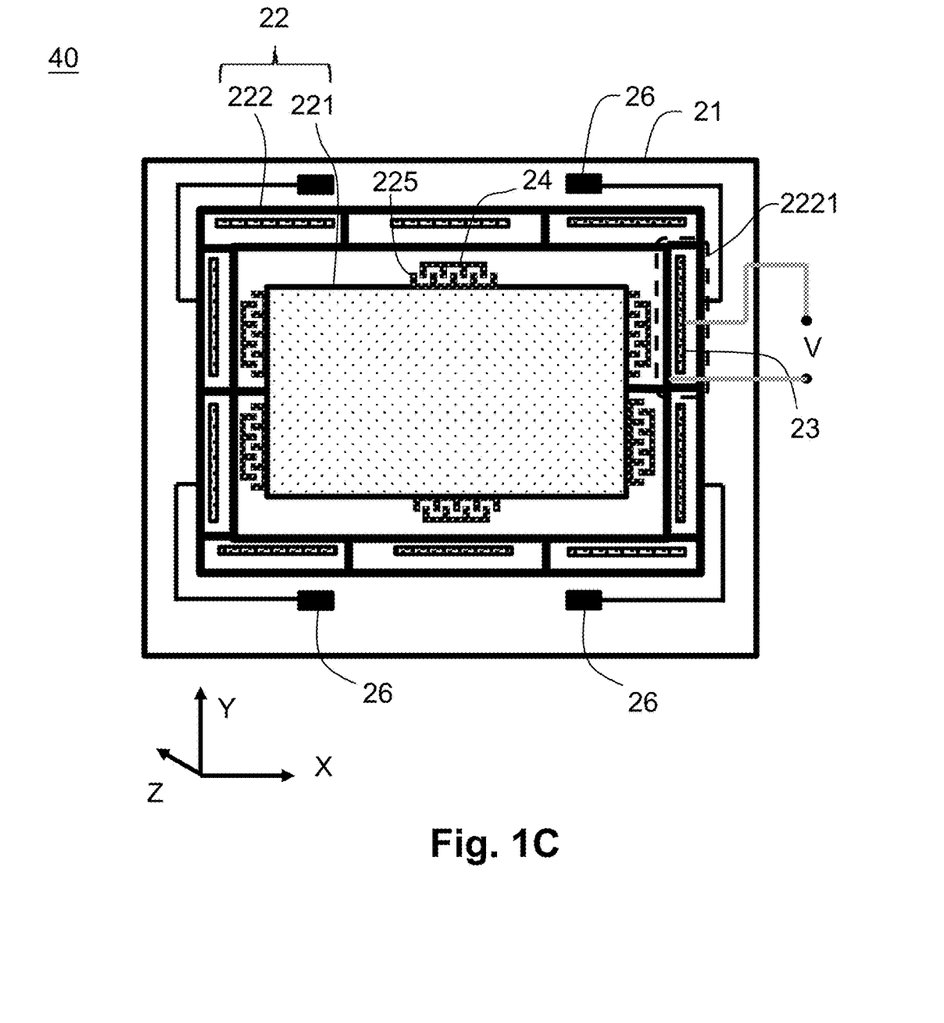
Figure 1D:
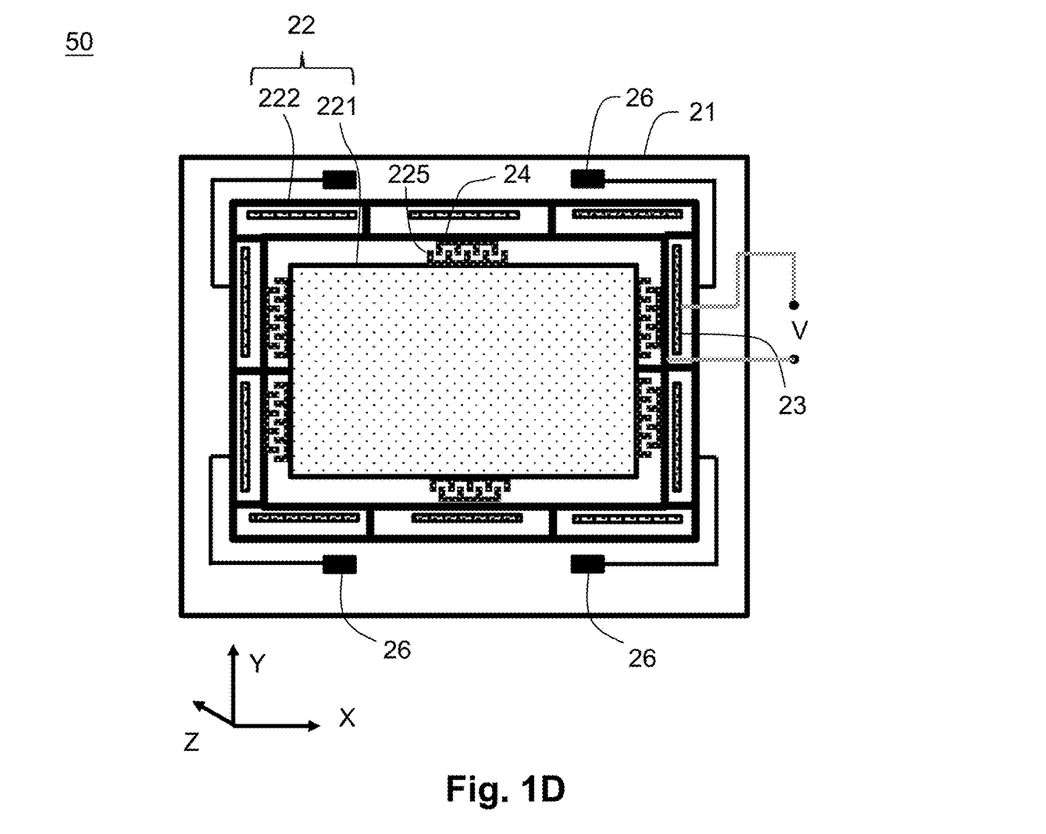

As shown in FIG. 1A, the MEMS device 20 further includes at least one fixed electrode 24 connected to the substrate 21, and the proof mass 22 further includes at least one moving electrode 223. The at least one fixed electrode 24 and the at least one moving electrode 223 form at least one sensing capacitor for sensing the in-plane movement of the proof mass 22. Thus, for example, the MEMS device 20 can be used as an accelerometer. The moving electrode 223 is connected to the proof mass frame 222 in the embodiment of FIG. 1A. In other embodiments, the moving electrode 223 can be part of the proof mass body 221 or connected to the proof mass body 221. FIG. 1B shows an embodiment wherein the at least one moving electrode 224 of the MEMS device 30 is part of or connected to the proof mass body 221, and is inside the proof mass body 221. FIG. 1C shows an embodiment wherein the at least one moving electrode 225 of the MEMS device 40 is part of or connected to the periphery of the proof mass body 221, between the proof mass body 221 and the proof mass frame 222. FIG. 1D shows an embodiment wherein the at least one moving electrode 225 of the MEMS device 50 is part of or connected to the periphery of the proof mass body 221, between the proof mass body 221 and the proof mass frame 222, and furthermore, the at least one fixed electrode 24 is a relatively fixed electrode which is part of or connected to the proof mass frame 222. Because the proof mass body 221 is capable of moving relatively to the proof mass frame 222, the MEMS device 50 is capable of sensing an acceleration in an in-plane direction. The above embodiments show that the number, shape and arrangement of the moving electrodes and the fixed electrodes can be designed in many possible ways, and the present invention is not limited to any particular number, shape and arrangement.

Figure 1E:
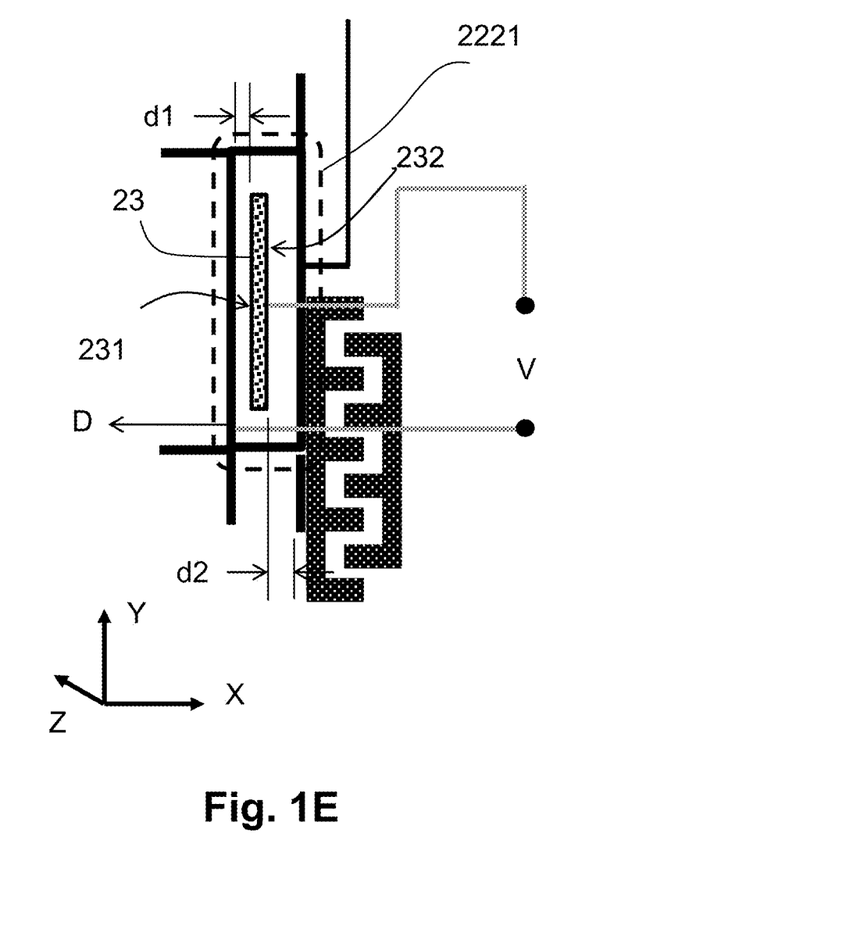
FIG. 1E shows the self-test frame and the self-test electrode inside the self-test frame.

FIG. 1E shows a more detailed view of a self-test unit and its periphery according to one embodiment of the present invention. The self-test electrode 23 has a first side 231 and a second side 232 opposite to the first side 231, and a first distance d1 between the first side 231 and a part of the self-test frame 2221 nearest to the first side 231 is different from a second distance d2 between the second side 232 and another part of the self-test frame 2221 nearest to the second side 232. Or, from a different view but equivalently, the self-test electrode 23 is located eccentrically inside the self-test frame 2221. Thus, when a voltage difference V is applied between the self-test electrode 23 and the self-test frame 2221, because the distances d1 and d2 are different and the distance d1 is shorter than the distance d2, the proof mass 22 is driven to produce an in-plane movement toward the direction D. Because the self-test unit formed by the self-test electrode 23 and the self-test frame 2221 is designed for self-test, the self-test electrode 23 and the self-test frame 2221 should not form a sensing capacitor in between. In the embodiment shown in FIG. 1E, the distance dl is shorter than the distance d2, but this is not limiting. In another embodiment, the distance d1 can be longer than the distance d2.

Referring to FIGS. 1A and 1B, preferably, the MEMS device 20 includes at least two self-test electrodes 23 and at least two self-test frames 2221 forming at least two self-test units respectively, for self-testing different sensing directions. A first one of the at least two self-test units (first self-test unit, such as the self-test unit 220A in FIG. 1B) is for driving the in-plane movement in a first in-plane direction (for example, direction X) and a second one of the at least two self-test units (second self-test unit, such as the self-test unit 220B in FIG. 1B) is for driving the in-plane movement in a second in-plane direction (for example, direction Y), wherein the first in-plane direction is not parallel to the second in-plane direction.

In the embodiment shown in FIG. 1B, the self-test unit 220A has a rectangular shape with a longitudinal direction along the second in-plane direction (direction Y), and the self-test unit 220B has a rectangular shape having a longitudinal direction along the first in-plane direction (direction X). Thus, a two-dimensional self-test can be performed.

If there are more than one self-test unit in one sensing direction, the distance d1 and d2 in every self-test unit in the same in-plane direction should preferably be the same, so that the test result can be evaluated more easily.

The voltage difference V can be a constant voltage difference signal or a dynamically changing voltage difference signal having a desired waveform.

Figure 2:
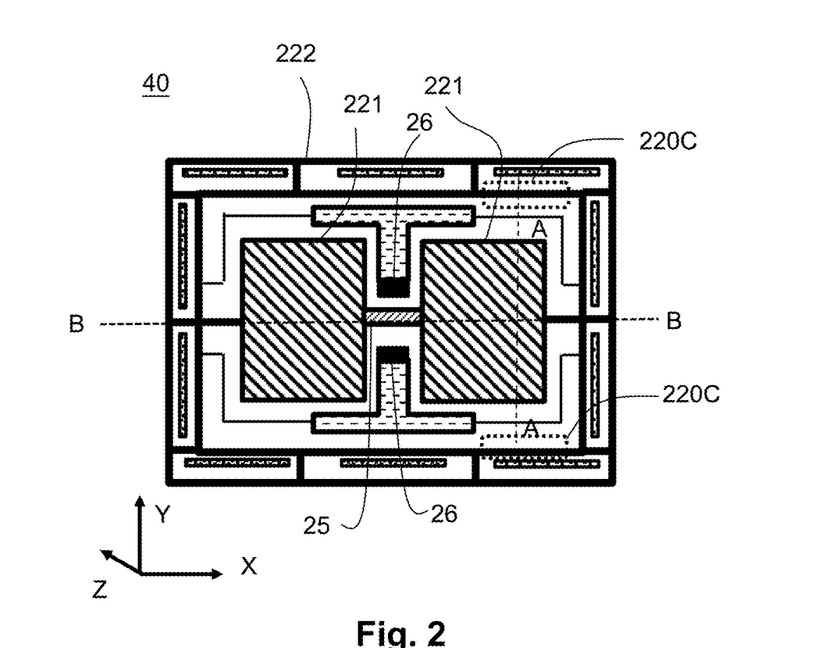
FIG. 2 shows a MEMS device according to another embodiment of the present invention.

FIG. 2 shows another embodiment according to the present invention. The MEMS device 40 includes two proof mass bodies 221 accommodated inside the proof mass frame 222, and the two proof mass bodies 221 are connected to each other by a linkage 25 in between. This embodiment shows that the number of proof mass bodies accommodated inside the proof mass frame is not limited.

Figure 3:
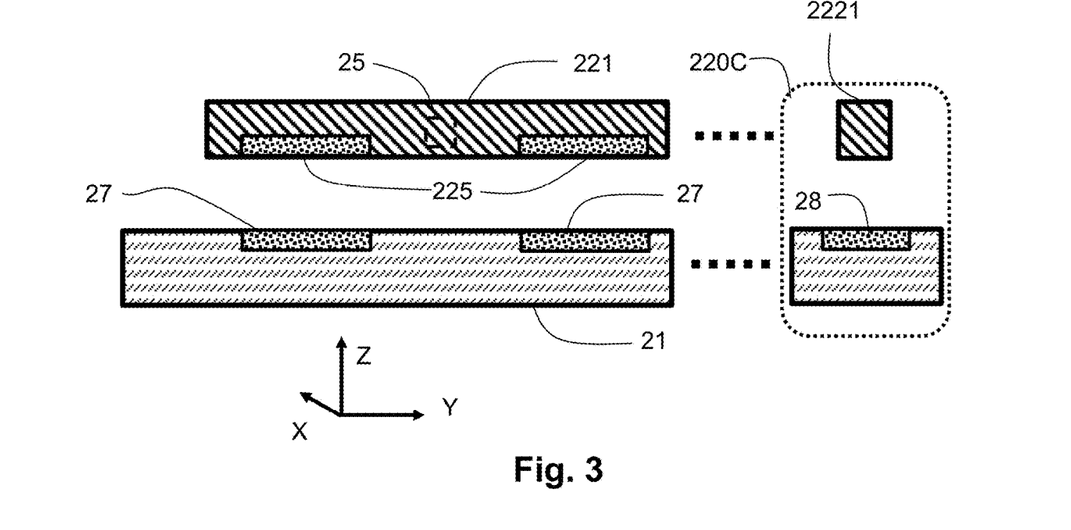
FIG. 3 shows a partial cross-section view according to the cross-section line AA shown in FIG. 2.

Further, please refer to FIG. 3, which is a partial cross-section view taken along a cross-section line AA shown in FIG. 2. As shown in FIG. 3, the substrate 21 includes or is connected to at least one out-of-plane fixed electrode 27 (two out-of-plane fixed electrodes 27 shown in the figure), and the proof mass 22 further includes at least one out-of-plane moving electrode 225 (two out-of-plane moving electrodes 225 shown in the figure; in this embodiment, the out-of-plane moving electrodes 225 are part of or connected to the proof mass body 221). The at least one out-of-plane fixed electrode 27 and the at least one out-of-plane moving electrode 225 format least one out-of-plane sensing capacitor for sensing an out-of-plane movement (direction Z) of the proof mass 22. That is, the MEMS device 40 is a three-dimensional sensor.

Further, in one preferable embodiment, the proof mass bodies 221 can perform an out-of-plane rotation movement along an axis BB shown in FIG. 2. Thus, the two out-of-plane sensing capacitors can form a differential pair to more accurately sense the out-of-plane movement.

In addition, FIG. 3 further shows an out-of-plane self-test unit 220C formed by an out-of-plane self-test electrode 28 and the self-test frame self-test frame 2221. The out-of-plane self-test electrode 28 is part of or connected to the substrate 21. FIG. 2 shows that there can be at least two out-of-plane self-test units, forming one (or more) differential pair.

FIGS. 1A and 2 show that the MEMS devices 20 and 40 include anchors 26 for connecting the proof mass 22 to the substrate 21. The number, shape and locations of the anchors are not limited to what are shown in the figures and can be modified as desired.

Referring to FIG. 1A, the proof mass body 221 has four sides 2211, 2212, 2213, and 2214, and in one preferable embodiment, at least one self-test unit is provided outside each side of the proof mass body 221.

In the embodiments described above, each self-test unit is formed by one self-test electrode 23 and a corresponding self-test frame 2221. The proof mass frame 222 includes plural self-test frames 2221, and the self-test electrodes 23 are respectively located inside the self-test frames 2221. In another embodiment, there can be more than one self-test electrodes located inside one self-test frame.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, "object A is part of or connected to object B" should be interpreted as: A and B can be made of the same or different materials, as one integrated piece or two different pieces. Besides, a component which does not affect the primary function of the units can be inserted between two units shown to be in direct connection in the figures. An embodiment or a claim of the present invention does not need to attain or include all the objectives, advantages or features described in the above. The abstract and the title are provided for assisting searches and not to be read as limitations to the scope of the present invention.

What is claimed is:

1. A micro-electro-mechanical system (MEMS) device, comprising:
a substrate having a center and four sides;
a proof mass suspended over the substrate, the proof mass including at least one proof mass body and a proof mass frame connected to and surrounding the proof mass body, the proof mass body being located within the proof mass frame, and the proof mass frame including at least one self-test frame which is located at an outer side of the proof mass body, whereby the proof mass body is closer to the center of the substrate than the self-test frame is; and
at least one self-test electrode inside the self-test frame, and connected to the substrate;
wherein the at least one self-test electrode and the self-test frame are configured to receive a voltage difference in between for checking an offset of the proof mass or a flexibility of the structure of the MEMS device and when the voltage difference is applied between the self-test electrode and the self-test frame, the proof mass is driven to have an in-plane movement, and wherein a capacitance signal between the self-test electrode and the self-test frame is not used for calculating the in-plane movement of the proof mass.

2. The MEMS device of claim 1, further comprising at least one fixed electrode connected to the substrate, the proof mass further comprising at least one moving electrode, the at least one fixed electrode and the at least one moving electrode forming at least one sensing capacitor for sensing the in-plane movement of the proof mass.

3. The MEMS device of claim 1, further comprising at least one fixed electrode connected to the substrate or the proof mass frame, the proof mass body further comprising at least one moving electrode, the at least one fixed electrode and the at least one moving electrode forming at least one sensing capacitor for sensing the in-plane movement of the proof mass.

4. The MEMS device of claim 1, further comprising two proof mass bodies accommodated inside the proof mass frame, the two proof mass bodies being connected to each other by a linkage in between.

5. The MEMS device of claim 1, wherein each self-test electrode has a first side and a second side opposite to the first side, and a first distance between the first side and a part of the self-test frame nearest to the first side is different from a second distance between the second side and another part of the self-test frame nearest to the second side.

6. The MEMS device of claim 1, comprising at least two self-test electrodes and at least two self-test frames forming at least two self-test units respectively, wherein a first one of the at least two self-test units (first self-test unit) is for driving the in-plane movement in a first in-plane direction and a second one of the at least two self-test units (second self-test unit) is for driving the in-plane movement in a second in-plane direction, wherein the first in-plane direction is not parallel to the second in-plane direction.

7. The MEMS device of claim 6, wherein the self-test electrode of the first self-test unit has a rectangular shape having a longitudinal direction along the second in-plane direction, and the self-test electrode of the second self-test unit has a rectangular shape having a longitudinal direction along the first in-plane direction.

8. The MEMS device of claim 7, further comprising at least one out-of-plane self-test electrode located above or under the self-test frame in an out-of-plane direction, wherein when a voltage difference is applied between the out-of-plane self-test electrode and the self-test frame, the proof mass is driven to have an out-of-plane movement, and wherein the out-of-plane self-test electrode and the self-test frame do not form a sensing capacitor in between.

9. The MEMS device of claim 1, further comprising at least one out-of-plane fixed electrode connected to the substrate, the proof mass further comprising at least one out-of-plane moving electrode, the at least one out-of-plane fixed electrode and the at least one out-of-plane moving electrode forming at least one out-of-plane sensing capacitor for sensing an out-of-plane movement of the proof mass.

10. The MEMS device of claim 1, wherein the proof mass body has four sides, and at least one self-test unit is provided outside each side of the proof mass body, and wherein the self-test unit is formed by one of the self-test electrodes and the self-test frame corresponding to the one of the self-test electrodes.

11. The MEMS device of claim 1, wherein the proof mass frame includes a plurality of self-test frames and at least one self-test electrode is located inside each self-test frame, wherein the plurality of self-test frames form a continuous structure outside each side of the proof mass body, to enclose the proof mass body.

* * * * *